J. L. RIPLEY.
Pipe-Wrenches.
No. 148,089.          Patented March 3, 1874.
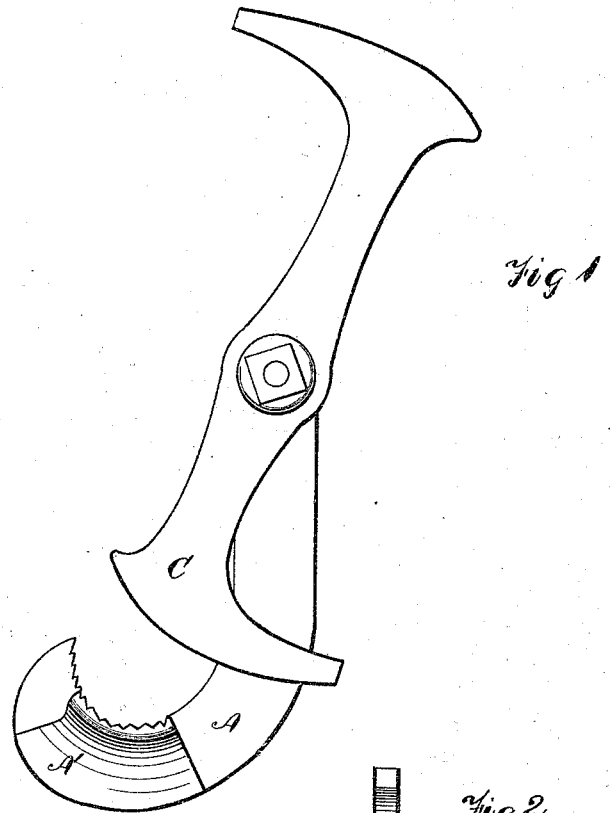
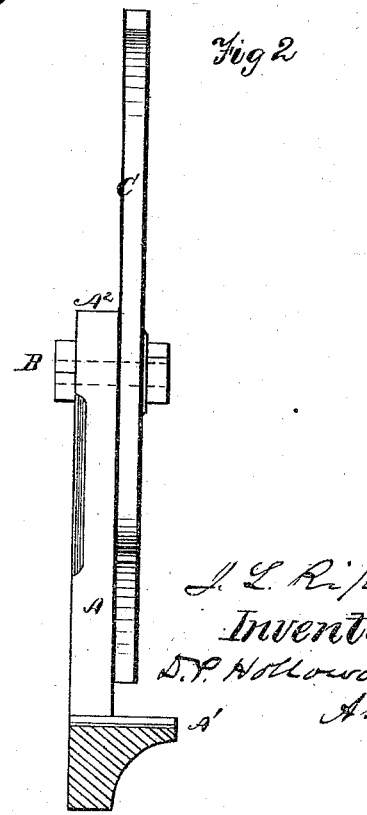
Witnesses
Wm Bradford
A. Ruppert
J. L. Ripley
Inventor
D. P. Holloway & Co
Attys

UNITED STATES PATENT OFFICE.

JOHN L. RIPLEY, OF JACKSONVILLE, FLORIDA.

IMPROVEMENT IN PIPE-WRENCHES.

Specification forming part of Letters Patent No. 148,089, dated March 3, 1874; application filed May 28, 1873.

*To all whom it may concern:*

Be it known that I, JOHN L. RIPLEY, of Jacksonville, in the county of Duval and State of Florida, have invented certain new and useful Improvements in Pipe-Wrenches, of which the following is a specification:

Figure 1 is a side elevation of my improved wrench, showing the hook in which the pipe is placed and the eccentrically-formed lever; and Fig. 2 is a side view of the same parts.

Corresponding letters refer to corresponding parts in each of the figures.

This invention relates to wrenches for turning pipes for securing them together, and for other purposes; and it consists in the construction and combination of its parts, as will be more fully explained hereinafter.

In constructing wrenches of this type, I employ a hook, A, of substantially the form shown in the drawing, it consisting of a piece of metal cast in or bent into the form of a hook at its lower end, the design being to adapt it to the reception of the pipe or bolt to be turned, and in order that it may receive and aid in clamping pipes of different diameters a portion of its interior surface is made circular in form, while another portion is made to assume an angle to a line drawn through the center of the circular portion, the object being to cause different portions of the surface of the hook to bear upon the pipe, as well as to adapt it for application to pipes of different sizes. Upon one side of this hook there is formed a projection, $A^1$, its office being to aid in supporting it upon the pipe, and to form a bearing directly opposite the end of a lever which forms a part of the clamping mechanism, and which is soon to be described. The interior surface of the projection $A^1$ is to be of the same form as is that portion of the hook to which it is attached, and the interior surfaces of both are to be serrated in such a manner as to cause the points of the serrations to prevent the hook from turning upon the pipe when clamped thereto. The end $A^2$ of this hook is extended from the curved portion such a distance as is deemed necessary in order to give the amount of leverage required, it varying in wrenches of different sizes, and is provided with an aperture for the reception of a bolt or rivet, B, which passes through it and through the eccentrically-formed lever C, and unites the two together. This lever is formed as shown in Fig. 1, its ends having outer surfaces in the form of segments of circles, which are eccentric to its pivotal point in order that each of its ends may be capable of aiding in clamping several different sizes of pipes.

In order that the wrench may be adapted for turning the greatest possible variety of pipes or bolts, the aperture through the bolt which attaches it to the hook portion A is some distance removed from its center, so that when its long arm is used for clamping several small-sized pipes may be acted upon, and when it is reversed, and its short arm is used for the same purpose, pipes of larger size will be clamped, the eccentrically-formed surfaces upon each of its ends enabling it to accomplish this result in conjunction with the hook.

Having thus described my invention, what I claim, and desire to secure by Letters Patent, is—

The reversible lever-handle C, having arms of unequal length, with eccentric heads, in combination with the hook of the tongs, substantially as and for the purpose specified.

In testimony whereof I have signed my name to this specification in the presence of two subscribing witnesses.

JOHN L. RIPLEY.

Witnesses:
J. H. H. BOURS,
C. B. BENEDICT.